H. W. SHELLY.
AUTO DIRECTION SIGNAL.
APPLICATION FILED OCT. 10, 1917.

1,335,033.

Patented Mar. 30, 1920.

WITNESS:

INVENTOR.
Harry W. Shelly,
BY
F. G. Fischer,
ATTORNEY.

UNITED STATES PATENT OFFICE.

HARRY W. SHELLY, OF KANSAS CITY, MISSOURI.

AUTO DIRECTION-SIGNAL.

1,335,033.

Specification of Letters Patent.  Patented Mar. 30, 1920.

Application filed October 10, 1917. Serial No. 195,710.

*To all whom it may concern:*

Be it known that I, HARRY W. SHELLY, a citizen of the United States, residing at Kansas City, in the county of Jackson and State of Missouri, have invented certain new and useful Improvements in Auto Direction-Signals, of which the following is a specification.

My invention relates to signaling devices for automobiles, and my object is to provide a new, and useful device of this character for the purpose of avoiding collisions by indicating to drivers of approaching or following automobiles, the direction of travel, that is whether the automobile equipped with my device will continue straight ahead, or turn to the right or left on reaching a corner.

In order that the invention may be fully understood, reference will now be made to the accompanying drawing, in which.

Figure 1:
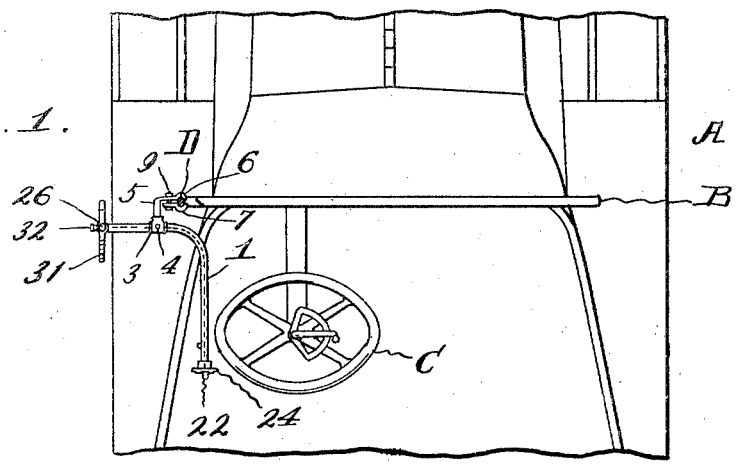
Figure 1 is a broken, plan view of an automobile equipped with the invention.
Figure 2:
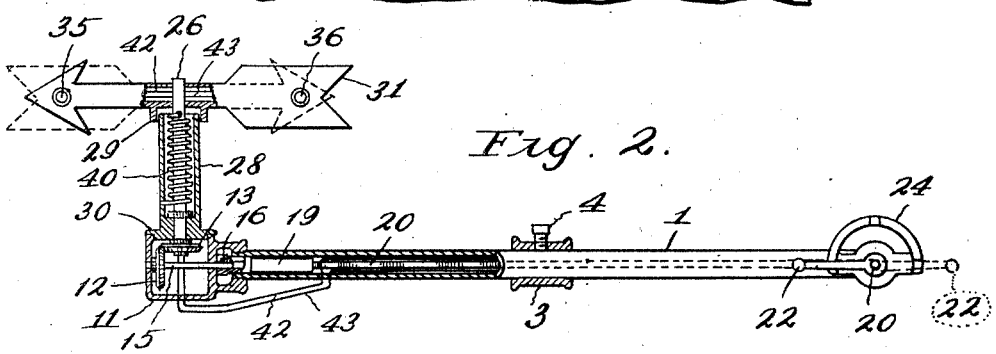
Fig. 2 is a rear elevation, partly in section of the device removed from the automobile.

Referring now in detail to the various parts, A designates the automobile which is equipped with the usual wind-shield B and steering wheel C.

1 designates a tubular housing rotatably and slidably mounted in a T-bearing 3, provided with a set screw 4, for securing the housing at any point of its adjustment. Said housing 1 is, preferably of substantially rightangular form, so that one end may project laterally from the automobile, while its opposite end extends rearwardly to a point adjacent the steering wheel C. The T-bearing 3 is provided with a bracket 5 having a fixed jaw 6 and a movable jaw 7, whereby it may be firmly clamped upon one of the standards D of the wind-shield B. A bolt 9 passing through the jaws serves to clamp them upon the standard D.

One end of the housing 1 is threaded into or otherwise removably-secured to a gear case 11, containing two intermeshing bevel gears 12 and 13. The gear 12 is fixedly-mounted upon a short shaft 15 journaled in the case 11 and provided at one end with a feather 16, adapted to enter a slot 17 in a slip-coupling 19, fixed to the forward end of a flexible shaft 20. Said flexible shaft 20 extends through the housing 1 and is provided at its rear end with a lever 22, adapted to be held in either of its three positions by a sector 24 fixed upon the rear end of the housing 1. The bevel gear 13 is fixed upon an upright spindle 26, journaled in the lower portion of a tubular member 28 provided at its lower terminal with a cap 30, threaded into the upper portion of the case 11. Rain, snow, etc., is excluded from the interior of the member 28, by an overlapping, circular apron 29, depending from an indicator 31.

The indicator 31 is mounted upon the upper end of the spindle 26 and secured by suitable means, such as a set-screw 32. Said indicator 31 may be of any suitable shape, but I prefer to make it in the form of an arrow, so that its front end can be readily distinguished from its rear end. The front and rear portions of the indicator 31 have openings extending transversely therethrough to receive electric lamps 35 and 36, respectively, the light from which is visible at both sides of the indicator. These lamps serve to distinguish at night the front portion of the indicator from its rear portion and the front lamp 35 is, preferably, equipped with a red globe and the rear lamp with a green globe.

The lamps 35 and 36 are connected to circuit wires 42 and 43, which may receive their current from any suitable source, such as the battery with which most automobiles are now equipped. A circuit breaker 45 is employed to open or close the circuit through the lamps, and has a controlling button 47 projecting through the rear portion of the tubular housing 1, within convenient reach of the driver.

A coil spring 40 loosely embracing the spindle 26 and having one end secured to the tubular member 28 and its opposite end secured to the spindle 26, tends to restore the indicator 31 to normal straight ahead position after said indicator has been rotated to the right or left through proper manipulation of the lever 22.

In practice, the bracket 5 is secured at the desired height on the wind-shield B. Whether the latter extends vertically or slants backwardly, is immaterial, as the tubular housing 1 is adjusted in the bearing 3 to hold the indicator 31 in a horizontal plane. The housing 1 is also adjusted laterally in the bearing 3 to hold the indicator 31 far enough from one side of the car to render said indicator visible to the driver of a following car. Should the driver of the equipped car decide to turn to the right or left on reaching a corner, he manipulates the lever 22 accordingly, which through the instrumentality of the shafting 20, the coupling 19 and the shafting 15 and 26, swings the indicator 31 in the direction in which said lever 22 is turned. Swinging of the indicator 31 to the right or left tensions the spring 40, so that the same will take up lost motion in the shafting and the gear wheels and secure said indicator 31 from vibration. This tensioning of the spring 40, also causes it to assist the driver in returning the indicator 31 to straight ahead position after turning a corner.

On cars with closed bodies, such as electrically propelled cars, the bracket 5 may be dispensed with and the housing 1 can be made straight instead of rightangular and fastened in one side of the car body. In this instance, the shaft 20 need not be flexible, but may consist of a straight piece.

Figures 3, 4, 5, 6:
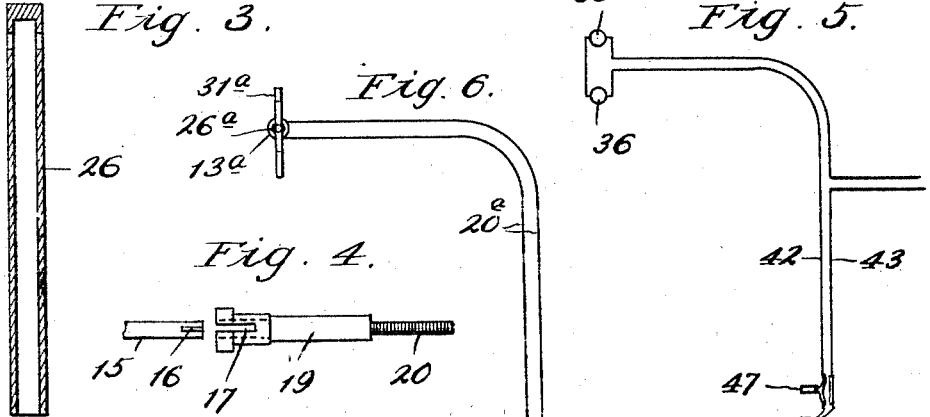
Fig. 3 is an enlarged, vertical, sectional view of a spindle for carrying the indicator of the device.
Fig. 4 is a broken elevation of two shafts and a slip-coupling for connecting said shafts.
Fig. 5 is a diagram of an electric light circuit.
Fig. 6 is a plan view of a modified form of certain parts of the device.

In the modified form disclosed by Fig. 6, a simplified form of gearing for rotating the indicator 31ª is shown. As disclosed, the indicator 31ª is mounted upon a spindle 26ª, provided with a sheave 13ª adapted to be rotated by an endless cable 20ª, which in turn is actuated by a sheave 12ª manually controlled through the intermediacy of a lever 22ª. The housing and other features (not shown) may be substantially the same as in the preferred form.

Having thus described my invention, what I claim and desire to secure by Letters Patent, is:

1. In a device of the character described, an indicator, rotary means for turning said indicator to the right and left, a support adapted to be secured to an automobile, a housing inclosing the greater portion of the rotary means and laterally and rotatably adjustable in said support, and means carried by the support for securing the housing at any point of its adjustment.

2. In a device of the character described, an indicator, rotary means for turning said indicator to the right and left, a housing inclosing the greater portion of said rotary means, a T-bearing in which said housing is adjustably-mounted, a bracket secured at one end in said T-bearing and provided at its opposite end with a jaw, a movable jaw to coact with the first jaw in securing the bracket to the wind shield of an automobile, and means for firmly holding said jaws in engagement with the wind shield.

3. In a device of the character described, an indicator, a spindle upon which said indicator is mounted, a tubular member in which said spindle is journaled, a coil spring secured at one end to said tubular member and at its opposite end to the spindle, a bevel gear wheel fixed to said spindle, a second bevel gear wheel intermeshing with the first one to actuate the same, shafting including a flexible member for rotating the second bevel gear wheel, and means for rotating said shafting.

In testimony whereof I affix my signature, in the presence of two witnesses.

HARRY W. SHELLY.

Witnesses:
F. G. FISCHER,
L. J. FISCHER.